United States Patent [19]
Kajiwara et al.

[11] Patent Number: 6,002,454
[45] Date of Patent: Dec. 14, 1999

[54] DISTORTION CORRECTION CIRCUIT

[75] Inventors: Mikio Kajiwara; Masashi Ochiai, both of Saitama-ken, Japan

[73] Assignee: Kabushiki Kaisha Toshiba, Kawasaki, Japan

[21] Appl. No.: 08/898,751

[22] Filed: Jul. 23, 1997

[30] Foreign Application Priority Data

Jul. 26, 1996 [JP] Japan ..................................... 8-197749

[51] Int. Cl.[6] ............................... H04N 3/22; H04N 3/26
[52] U.S. Cl. ......................... 348/806; 348/807; 348/746; 315/368.18
[58] Field of Search .................................... 348/806, 807, 348/746, 747, 572, 571; 345/368.18, 368.12, 368.24

[56] References Cited

U.S. PATENT DOCUMENTS

| | | | |
|---|---|---|---|
| 4,101,926 | 7/1978 | Dischert et al. | 348/571 |
| 4,970,442 | 11/1990 | Harada | 315/367 |
| 5,041,764 | 8/1991 | Midland et al. | 315/368 |
| 5,436,536 | 7/1995 | Van Der Wilk et al. | 315/368.25 |
| 5,452,022 | 9/1995 | Yamamoto et al. | 348/572 |
| 5,519,447 | 5/1996 | Shima et al. | 348/806 |
| 5,663,615 | 9/1997 | Ogino | 348/806 |
| 5,764,311 | 6/1998 | Bonde et al. | 348/806 |
| 5,784,120 | 7/1998 | Cummins et al. | 348/537 |
| 5,793,447 | 8/1998 | Fujiwara et al. | 348/806 |

FOREIGN PATENT DOCUMENTS

589512A2  3/1994  European Pat. Off. .
2137849  10/1984  United Kingdom .

*Primary Examiner*—John K. Peng
*Assistant Examiner*—Linus H. Lo
*Attorney, Agent, or Firm*—Pillsbury Madison & Sutro

[57] ABSTRACT

After analog-to-digital conversion, a luminance signal 103 and a chrominance signal 109 are stored in a line memory circuit 128. Such stored signals are read out of said line memory circuit, using a read clock 124 obtained by parabolically modulating a read frequency with both the horizontal period and the vertical period. The read-out digital signal is again converted into an analog luminance signal 132 and analog color difference signals 135, 136 by digital-to-analog conversion. By this procedure, inner pincushion distortion or inner barrel distortion is corrected. Since such distortion is corrected by modulating an image signal itself by digital processing, no circuit drift due to the conventional analog correction occurs and no analog circuit design such as troublesome setting of parts constants is required.

4 Claims, 9 Drawing Sheets

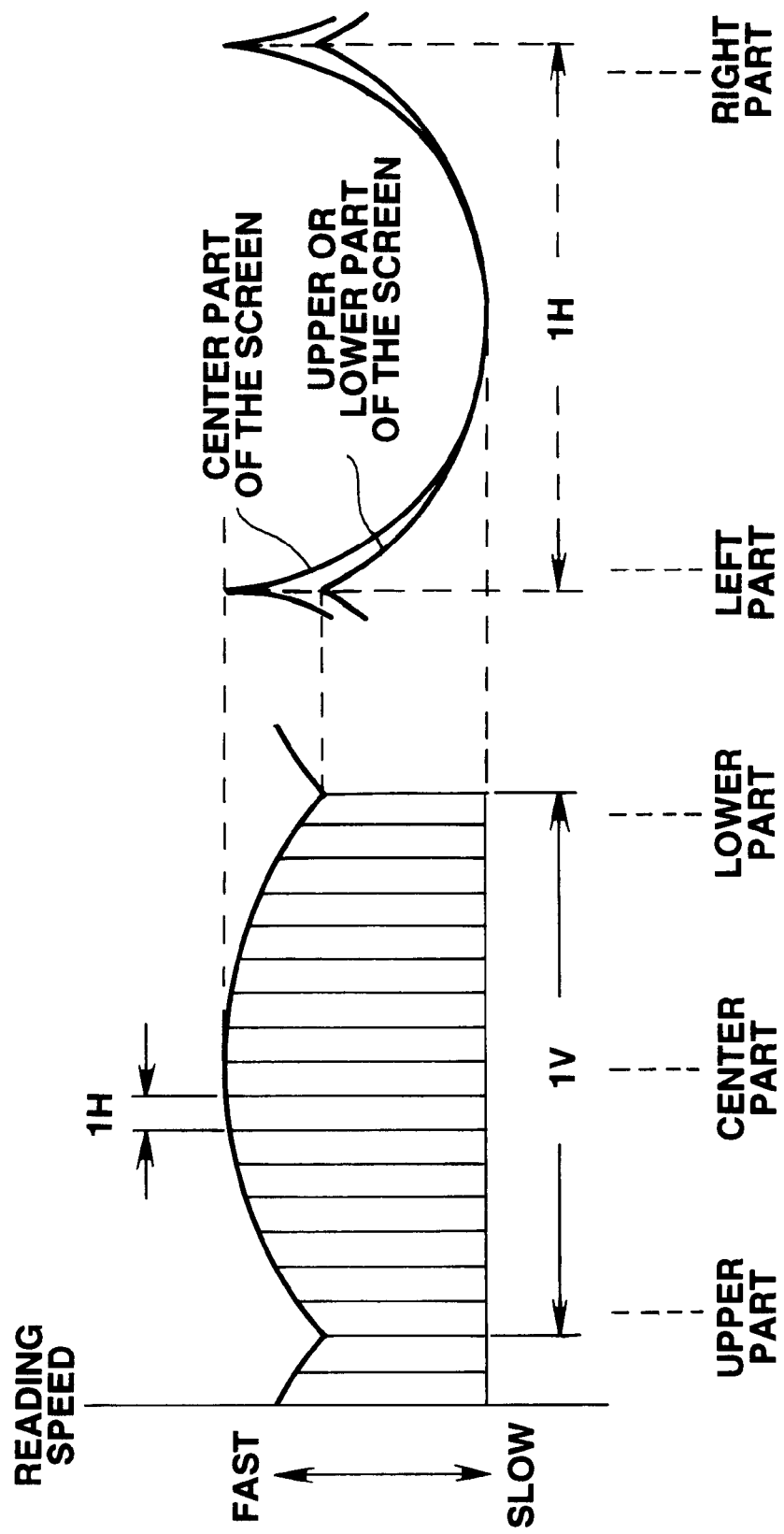

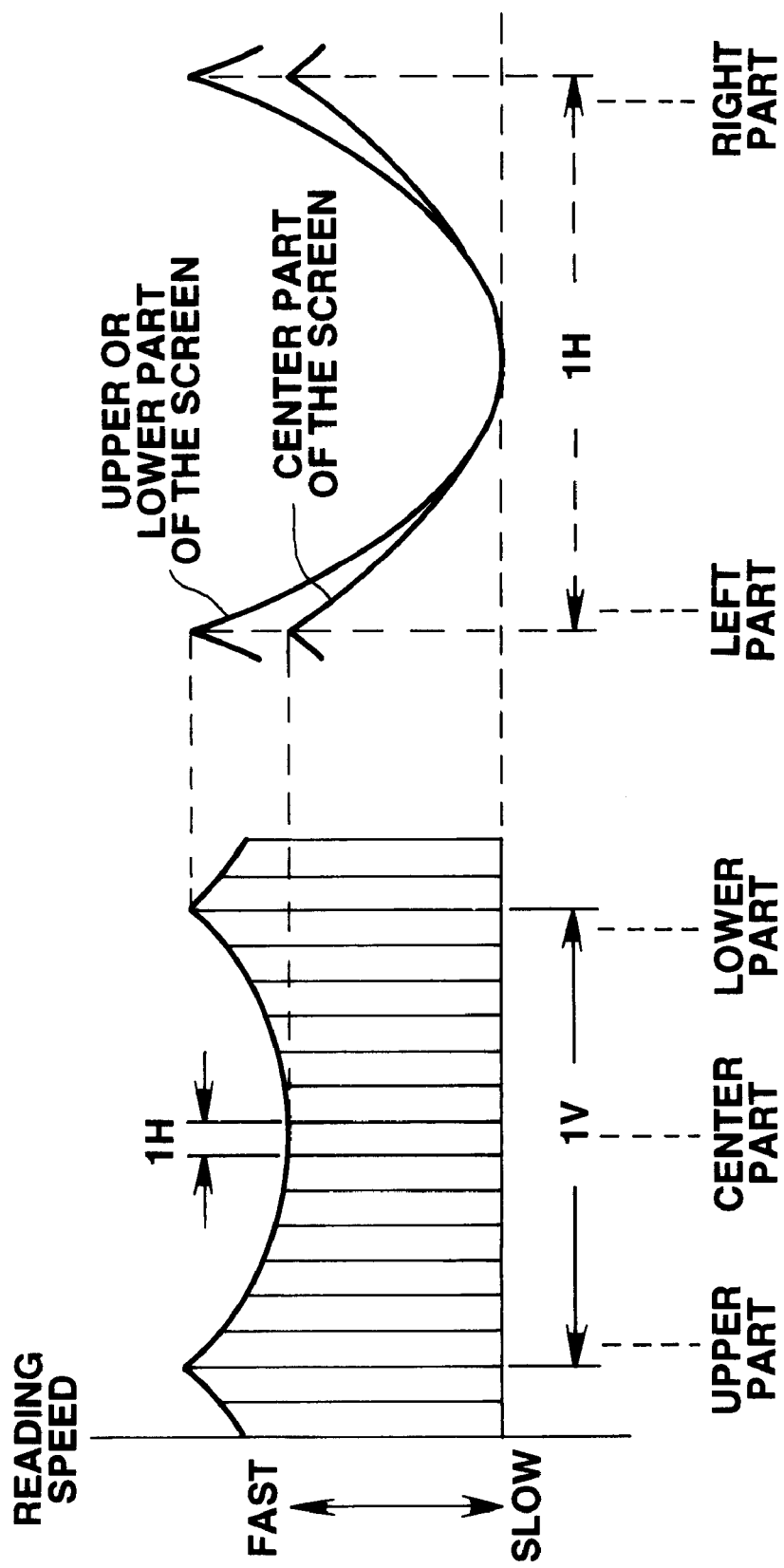

DISTORTION CORRECTION CIRCUIT

BACKGROUND OF THE INVENTION

1. Field of the Invention

The present invention relates to a distortion correction circuit which is mounted on a television receiver or the like to correct image distortion.

2. Description of the Related Art

Conventionally, a raster on a fluorescent screen showed pincushion distortion in the deflection process of a color television receiver because the radius of curvature of a fluorescent screen is longer than the axial length from a deflection center to a fluorescent screen. This distortion is called pincushion distortion. Even though a uniform pincushion correction is applied to the entire screen, pincushion distortion still remains in the center part (hereinafter called inner pincushion distortion) because of the difference of distortion degree between the peripheral part and the center part of the screen. Such inner pincushion distortion which is a shrinkage in the center part is caused by the difference of a horizontal linearity between the upper/lower parts and the center part of the screen.

FIG. 7 shows a distortion correction circuit of voltage modulation type called a diode modulator circuit. A diode modulator circuit of negative system will be described below. In this circuit, distortion is corrected by using the negative potential at a point C.

In FIG. 7, pulses of the horizontal period are supplied to an input terminal 1 and supplied to the base of a horizontal output transistor Q1. A damper diode D1 is connected in parallel between the collector and the emitter of the horizontal output transistor Q1 so that the cathode of the former is connected with the collector of the latter. In addition, a resonant capacitor C2 is connected in parallel with the horizontal output transistor Q1. Furthermore, the combination of a horizontal deflection coil Ly, a linearity coil L1 and a damping resistor R1 which are connected in parallel with each other, and S-shape correction capacitors C4 and C5 serially connected are connected in parallel with that transistor Q1.

The collector of the horizontal output transistor Q1 is connected with a power supply terminal 2 through the primary winding T1 of a flyback transformer FBT so as to supply the power supply voltage VB. Additionally, a resonant capacitor C1 is connected between the collector of the horizontal output transistor Q1 and the reference potential point.

The emitter of the horizontal output transistor Q1 is connected with the reference potential point via a parallel circuit of a modulation diode D2 and a resonant capacitor C3, and at the same time via a modulation coil L3 and a modulation capacitor C6. A joint A between the S-shape correction capacitors C4 and C5 is connected with the reference potential point via a coil L2.

A joint B of the modulation coil L3 and the modulation capacitor C6 is connected with the reference potential point via a resistor R2 and the collector-emitter path of the transistor Q2. A parabolic wave generating circuit (not shown) which generates the parabolic wave voltage of the vertical period is connected with a terminal 3 which is connected with the base of the transistor Q2.

The above-mentioned circuit is a horizontal output circuit in which the damper diode D1 and the resonant capacitor C2 are connected in parallel with the horizontal output transistor Q1. In addition, in this circuit, a distortion correction circuit is connected with the peripheral part of the S-shape correction capacitors C4 and C5. The S-shape capacitor is divided into C4 and C5. A coil L2 is connected between the joint A of these capacitors C4 and C5 and the reference potential point. For the purpose of distortion correction, a distortion correction circuit consisting of a series circuit of the coil L3 and the capacitor C6 as well as the resonant capacitor C3 is connected in parallel between one terminal of the S-shape correction capacitor C5 (the emitter of Q1) and the reference potential point. The diode D2 maintains the negative voltage generated at the emitter of the transistor Q1 and guarantees the operation of the horizontal output transistor Q1.

In the horizontal scanning period, the horizontal deflection current flows through the horizontal output transistor Q1 or the damper diode D1. The current I1 flows from the S-shape correction capacitor C5 through the coil L2. The charge stored in the S-shape correction capacitors C4 and C5 flows to the horizontal deflection coil Ly through the coil L1 as a horizontal deflection current ly. Only the horizontal deflection current ly flows through the S-shape correction capacitor C4 on the horizontal deflection coil side. Both I1 and ly flow through the S-shape correction capacitor C5. The parabolic wave voltage of the vertical period is applied to the terminal 3 connected with the base of the transistor Q2 to modulate the terminal voltage Vm of the capacitor 6 parabolically. When the voltage Vm of the capacitor C6 is modulated parabolically with the vertical period, the S-shape capacitor voltage (Vc5+Vc4) as the power source of the horizontal deflection current ly is modulated as expressed by Vc5+Vc4=VB+Vm. In the above equation, Vc5 is the voltage across the S-shape correction capacitor C5, and Vc4 is the voltage across the S-shape correction capacitor C4. In this case, the capacity of the S-shape correction capacitor is set as C5<<C4, so Vc4 can be disregarded. That is, Vc5 is modulated parabolically with the vertical period by modulating Vm. Therefore, as shown in FIG. 8, the voltage of the horizontal period Vc5 modulated parabolically with the vertical period appears across the S-shape correction capacitor C5.

By using the voltage waveform modulated parabolically with the vertical period, inner pincushion distortion which occurs different horizontal linearities in the upper/lower and the center parts of the screen and occurs a shrinkage in the center part of the screen, is corrected to a uniform pincushion distortion as shown with the dotted line and the solid line in FIG. 9(a). Such corrected pincushion distortion is further corrected as shown in FIG. 9(b) by adjusting the parabolic wave by a DPC (Dynamic Pincushion Correction) circuit.

FIG. 10 shows the circuit diagram of a diode modulator circuit of positive system. Compared with the diode modulator circuit of the negative system shown in FIG. 7, the emitter of the horizontal output transistor Q1 is connected with the reference potential point and the diode D2 is connected serially in the same direction as that of the damper diode D1. In this circuit, the resonant capacitor C1 is removed between the collector of the horizontal output transistor Q1 and the reference potential point. In the circuit shown in FIG. 7, distortion is corrected by using the negative potential at the point C, but in the circuit shown in FIG. 10, such correction is performed by using the positive voltage at the point C.

However, the circuits shown in FIG. 7 or 10 are disadvantageous in the substrate area and the cost, because large parts such as coils and capacitors are employed. In addition, each time the inductance of a deflection yoke and the curvature of a picture tube change due to the model change, it is necessary to redesign the part constants, which is troublesome.

SUMMARY OF THE INVENTION

It is an object of the present invention to provide a distortion correction circuit which can correct the distortion of an image on the screen without performing the troublesome calculation of the constants of newly adopted parts.

A distortion correction circuit according to the first invention comprises:

an analog-to-digital (A/D) conversion means for receiving the analog luminance signal and the analog color difference signals to convert them into the corresponding digital signals respectively;

a memory means for storing the signals subjected to analog-to-digital conversion by the A/D conversion means;

a write/read controlling means for controlling the write/read operations for the memory means and for modulating the reading speed parabolically with both horizontal period and vertical period when reading the data which have been written in the memory means;

a digital-to-analog (D/A) conversion means for converting the signal read out of the memory means into an analog luminance signal and the analog color difference signals.

In the case of the first invention, the luminance signal and the color difference signals after the A/D conversion are stored in the memory means once. When reading such stored signal out of the memory means, reading speed is modulated parabolically with both the horizontal period and the vertical period. Such a modulated digital signal is subjected to the D/A conversion to obtain an analog luminance signal and an analog color difference signals and the inner pincushion distortion or the inner barrel distortion is corrected. That is, distortion can be corrected by modulating the image signal itself by digital processing, so circuit drift due to the conventional analog correction does not occur and no complicated analog circuit design is required.

In the case of the second invention, the above-mentioned write/read controlling means in the distortion correction circuit of the first invention is characterized in that inner pincushion distortion is corrected by the following process: when the reading speed is modulated parabolically, the modulating speed in the horizontal direction is increased in the center part of the screen during the vertical period and decreased in the upper and lower parts of the screen. The modulating speed is decreased in the center part of the screen during the horizontal period and increased at the right and left parts of the screen. Further, regarding the term of the horizontal period in the center part of the screen during the vertical period and at the upper and lower parts of the screen, the modulating speed is increased on the scanning lines in the center part in comparison with that on the scanning lines in the upper and lower parts at the right and left parts of the screen.

According to the second invention, inner pincushion distortion can be corrected.

In the case of the third invention, the above-mentioned write/read controlling means in the distortion correction circuit of the first invention is characterized in that the inner barrel distortion is corrected by the following process: the modulating speed in the horizontal direction is decreased at the center part of the screen during the vertical period and increased in the upper and lower parts of the screen. The modulating speed is decreased in the center part of the screen during the horizontal period and increased in the right and left parts of the screen. Further, regarding the term of the horizontal period in the center part of the screen during the vertical period and at the upper and lower parts of the screen, the modulating speed is decreased on the scanning lines in the center part in comparison with that on the scanning lines in the upper and lower parts at the right and left parts of the screen.

According to the third invention, inner barrel distortion can be corrected.

In the case of the fourth invention, the above-mentioned write/read controlling means in the distortion correction circuit of the first invention comprises:

a clock generating circuit for generating a first timing signal, a first write clock having a frequency of a predetermined multiple of a horizontal scanning frequency and a second clock having a frequency of a predetermined multiple different from the above multiple of the horizontal scanning frequency on the basis of the horizontal synchronizing signal;

a digital control oscillator for generating a clock, on the basis of the second clock above described, whose oscillation frequency is parabolically modulated with both horizontal period and vertical period;

a horizontal parabolic wave generating circuit for generating a parabolic wave signal of the horizontal period on the basis of the horizontal synchronizing signal and supplying that signal to the digital control oscillator;

a vertical parabolic wave generating circuit for generating a parabolic wave signal of the vertical period on the basis of the vertical synchronizing signal and supplying that signal to the digital control oscillatora;

digital-to-analog converter which converts the output of the digital control oscillator into an analog signal and outputs that signal to the memory means as a read clock;

a timing generating circuit for generating a write timing signal on the basis of the first timing signal and the first clock, and also generating a read timing signal on the basis of the first timing signal and the read clock from the D/A converter.

In the case of the fourth invention, a read clock is generated digitally in the digital control oscillator and a read clock frequency can be parabolically and precisely modulated with both horizontal period and vertical period.

BRIEF DESCRIPTION OF THE DRAWINGS

FIG. 3(a) is a diagram showing the modulation waveform of the reading speed during the vertical period (1V) for removing inner pincushion distortion in the line memory circuit of FIG. 1.

FIG. 3(b) is a diagram showing the modulation waveform of the reading speed during the horizontal period (1H) for removing inner pincushion distortion in the line memory circuit of FIG. 1.

FIG. 5(a) is a diagram of the modulation waveform of the reading speed at 1V for removing inner barrel distortion in the line memory circuit of FIG. 1.

FIG. 5(b) is a diagram of the modulation waveform of the reading speed at 1H for removing inner barrel distortion in the line memory circuit of FIG. 1.

DETAILED DESCRIPTION OF THE PREFERRED EMBODIMENTS

The preferred embodiments of the present invention will be described below with reference to the drawings.

Figure 1:
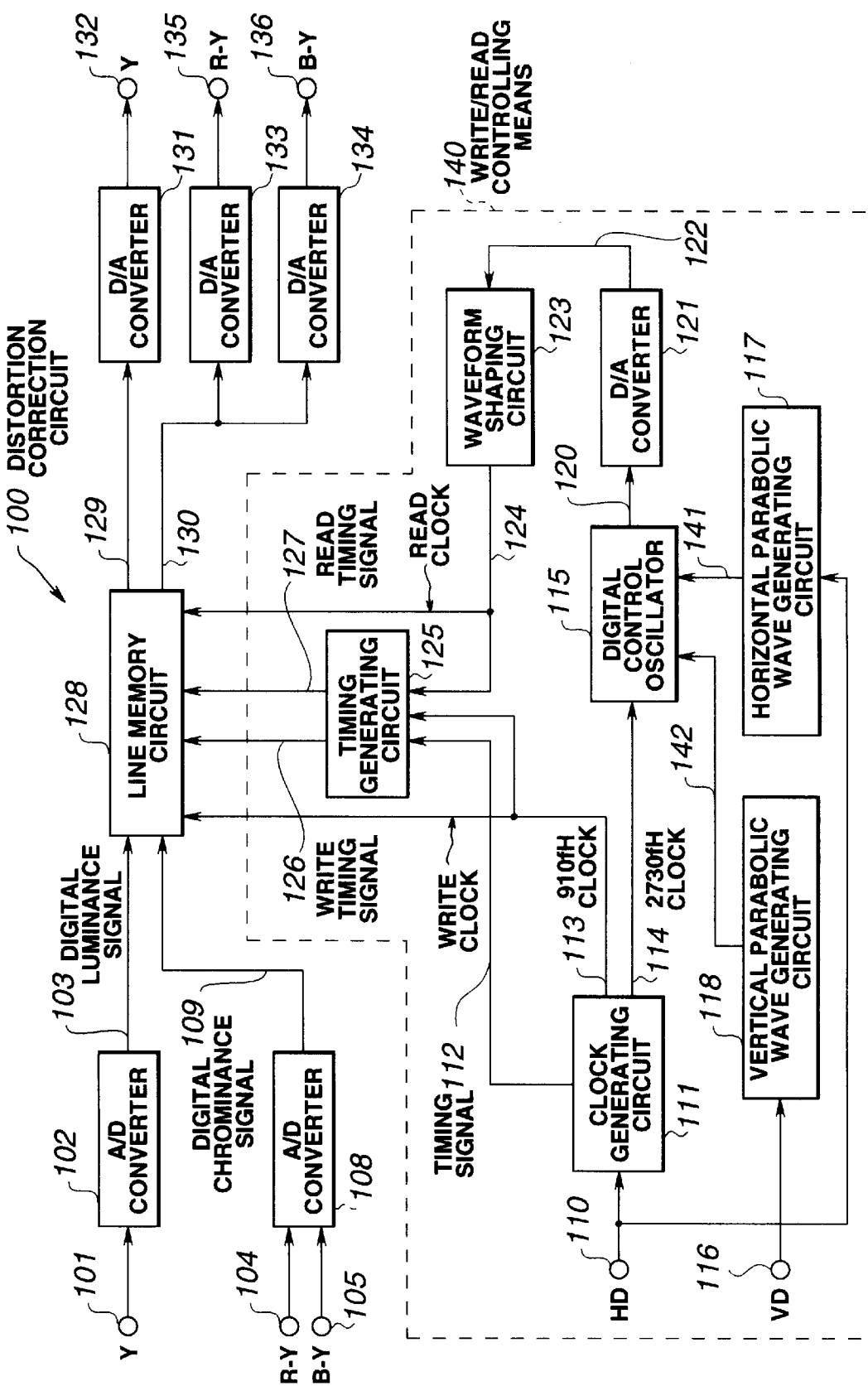
FIG. 1 is a block diagram showing the distortion correction circuit of an embodiment according to the present invention.
Figure 2:
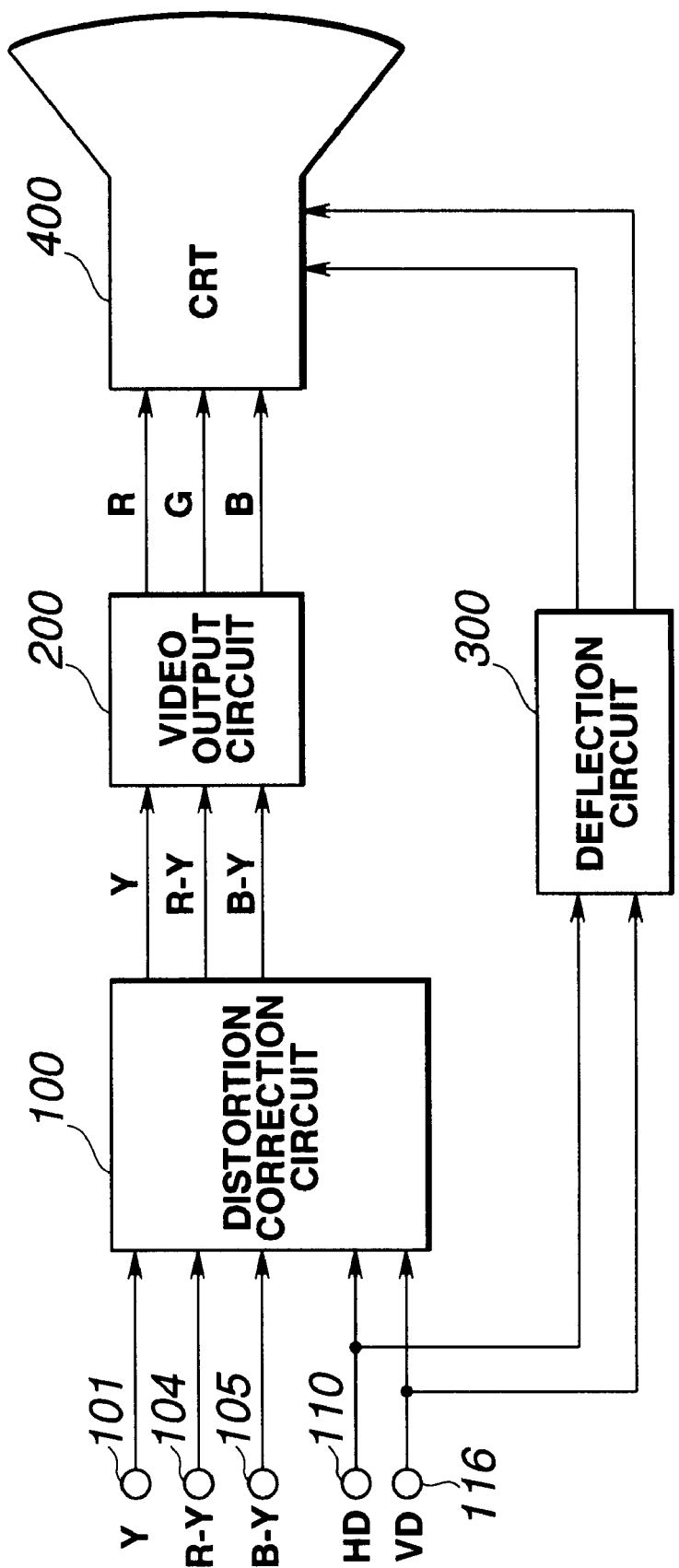
FIG. 2 is a block diagram showing the configuration of a display apparatus in which the distortion correction circuit of FIG. 1 is used.

FIG. 1 is a block diagram showing the distortion correction circuit of an embodiment of the present invention. FIG. 2 is a block diagram of the display apparatus such as a television receiver in which the distortion correction circuit of FIG. 1 is used. First, the display apparatus of FIG. 2 will be described below.

In FIG. 2, the display apparatus comprises a distortion correction circuit 100, a video output circuit 200, a deflection circuit 300 and a cathode ray tube (CRT) 400.

The analog luminance signal Y and the analog color difference signals R-Y and B-Y are applied to the distortion correction circuit 100. These signals are respectively converted into the corresponding digital signals. Then the resulting signals are written in the memory means. When these signals are read from the memory means, the reading speed of the Y, R-Y and the B-Y signals are modulated parabolically with both horizontal period (hereinafter called 1H) and vertical period (hereinafter called 1V) according to the signal based on the horizontal synchronizing signal HD and the vertical synchronizing signal VD. They are converted again into the analog luminance signal Y and the color difference signals R-Y and B-Y and outputted therefrom.

The luminance signal Y and the color difference signals R-Y and B-Y from the distortion correction circuit 100 are applied to the video output circuit 200. The video output circuit supplies three primary color signals, a red (R) signal, a green (G) signal and a blue (B) signal to the CRT 400.

The horizontal synchronizing signal HD and the vertical synchronizing signal above-mentioned are applied to the deflection circuit 300. This circuit supplies the horizontal deflection current and the vertical deflection current to the deflection yoke of the cathode ray tube (CRT) 400. It includes a DPC (Dynamic Pincushion Correction ) circuit.

In FIG. 1, the analog luminance signal Y is applied to the input terminal 101. That signal is converted into a digital luminance signal 103 in the A/D converter 102. This digital luminance signal is applied to the line memory circuit 128 as a memory means. The analog color difference signals R-Y and B-Y are respectively applied to the input terminals 104, 105. These signals are supplied to the A/D converter 108. In this converter, they are multiplexed each other and converted into a digital chrominance signal 109 and supplied to the line memory circuit 128.

The digital signal is written in the line memory circuit 128 by using the write clock 113 from the clock generating circuit 111 according to the write timing signal 126 from the timing circuit 125.

The horizontal synchronizing signal HD is applied to the input terminal 110, then to the clock generating circuit 111. The clock generating circuit 111 generates the timing signal 112 for the write/read timing, a 910fH clock (113) having a frequency of 910 times as high as the horizontal scanning frequency fH, and a 2730fH clock (114) having a frequency 2730 times as high as the horizontal scanning frequency fH.

The timing signal 112 is applied to the timing generating circuit 125. The 910fH clock (113) is applied to the line memory circuit 128 as the write clock, and at the same time to the timing generating circuit 125. The timing circuit 125 generates a write timing signal 126 synchronized with the 910fH clock (113), using the timing signal 112 and the above-mentioned 910fH clock (113) and supplies it to the line memory circuit 128.

The 2730fH clock (114) is applied to the digital control oscillator 115. The digital control oscillator 115 generates a read clock in a digital manner on the basis of the 2730fH clock (114). It has the function to modulate the read clock frequency, namely, the reading speed with 1H and IV, using the horizontal parabolic wave signal 141 from the horizontal parabolic wave generating circuit 117 and the vertical parabolic wave signal 142 from the vertical parabolic wave generating circuit 118.

The horizontal parabolic wave generating circuit 117 generates the parabolic wave signal 141 of 1H on the basis of the horizontal synchronizing signal HD supplied to the input terminal 110 and supplies it to the digital control oscillator 115 as a control signal. The vertical parabolic wave generating circuit 118 generates the parabolic wave signal 142 of 1V on the basis of the vertical synchronizing signal VD supplied to the input terminal 116 and supplies it to the digital control oscillator 115 as a control signal. The digital clock signal 120 speed-modulated parabolically with 1H and 1D to be outputted from the digital control oscillator 115 is converted into an analog clock signal 122 in the D/A converter 121. The waveform of the resulting signal is shaped in the waveform shaping circuit 123 and supplied to the line memory circuit 128 as a reading clock 124 and to the above-mentioned timing generating circuit 125. The timing generating circuit 125 generates a read timing clock 127 synchronized with the read clock 124, using the timing signal 112 and the read clock 124 and supplies it to the line memory circuit 128. The circuit portion in the dotted line frame 140 is the write/read controlling means.

In the line memory circuit 128, the reading speed of the digital luminance signal Y and the digital color difference signals R-Y and B-Y stored therein are modulated and read as signals 129, 130. The digital luminance signal 129 is supplied to the D/A converter 131, and the digital chrominance signal 130 is supplied to the D/A converters 133, 134

The D/A converter 131 converts the digital luminance signal into the analog luminance signal Y and outputs it from the output terminal 132. The D/A converter 133 separates the digital color difference signal R-Y from the multiplexed digital chrominance signal 130, converts the separated signal into the analog color difference signal R-Y and outputs it from the output terminal 135. The D/A converter 134 separates the digital color difference signal B-Y from the multiplexed digital chrominance signal 130, converts the separated signal into the analog color difference signal B-Y and outputs it from the output terminal 136.

Figure 4A:
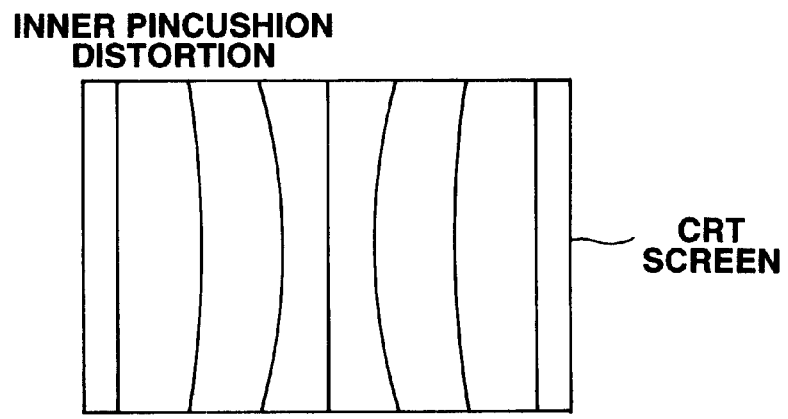
FIGS. 4(a)–(c) are diagrams for describing an inner pincushion distortion correction sequence in the circuit of FIG. 1.
Figure 4B:
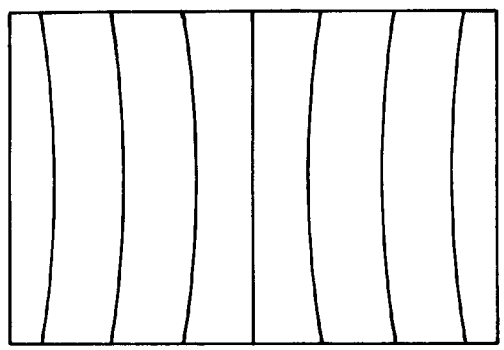

The operation shown in FIG. 1, especially the operation for correcting inner pincushion distortion shown in FIG.4(a) will be described below with reference to FIGS. 3(a) and (b) and FIGS. 4(a)–(c).

The analog luminance signal Y and the analog color difference signals R-Y and B-Y are applied to the input terminals 101, 104 and 105. The horizontal synchronizing signal HD and the vertical synchronizing signal VD are applied to the input terminals 110, 116. The analog luminance signal Y and the color difference signals R-Y and B-Y are respectively converted into the corresponding digital signals in the A/D converter 102, 108. The resulting signals are written in the line memory circuit 128. Such signals are written according to the write timing signal 126 from the timing generating circuit 125 and the write clock 113 from the clock generating circuit 111. The write clock 113 is a clock having the constant frequency of 910fH.

In the read operation, the digital control oscillator 115 generates a digital read clock 120 according to a clock 114 having the frequency of 2730fH. In this case, the frequency of the generated signal (namely, the reading frequency) is modulated with IH and 1 V, using the parabolic wave signal 141 of 1H from the horizontal parabolic wave generating circuit 117 and the parabolic wave signal 142 of 1V from the vertical parabolic wave generating circuit 118 as control signals. The resulting digital clock signal 120 is converted into an analog signal 122 in the D/A converter 121. The waveform of the converted signal is shaped in the waveform shaping circuit 123 and supplied to the line memory circuit 128 as the read clock 124. When the digital luminance signal and the digital chrominance signal stored in the line memory circuit 128 are read from the line memory circuit 128, the reading speed of the digital luminance signal and the digital chrominance signal is parabolically modulated with IH and IV according to the read clock 124.

FIG. 3(a) shows the modulation waveform of the reading speed at 1V. FIG. 3(b) shows the modulation waveform of the reading speed at 1H. To correct inner pincushion distortion, as shown in FIG. 3(a), it is necessary to increase the modulating speed in the horizontal direction in the center part of the screen during 1V and to decrease the modulating speed in the upper and lower parts of the screen. At the same time, as shown in FIG. 3(b), it is also necessary to slow down the modulating speed in the center part of the screen during 1H and to speed up such speed in the right and left parts of the screen. As shown in FIG. 3(b), it is also necessary to change the modulating speed regarding the period of 1H in the center part of the screen during 1V and in the upper and lower parts of the screen. That is, as shown in FIG. 3(b), the modulating speed on the scanning lines in the center part is higher than that on the scanning lines in the upper and lower parts at the right and left parts of the screen. That is, the modulating speed on the scanning lines in the upper and lower parts of the screen is slower than that on the scanning lines in the center part at the right and left parts of the screen.

The digital luminance signal and the digital chrominance signal read out of the line memory circuit 128 are again converted into an analog luminance signal Y and analog color difference signals R-Y and B-Y in the D/A converters 131, 133, and 134. The resulting signals are applied to the video output circuit (200 in FIG. 2) (not shown in this fig.) and displayed on the CRT.

Figure 4C:
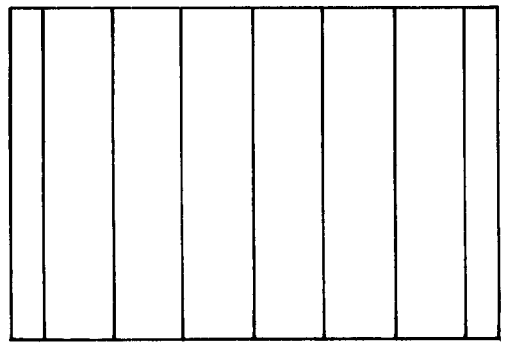

Using the 1V and 1H reading speed modulation means by the line memory circuit 128 as described above, the distortion of an image to be displayed on the CRT is corrected as shown in FIG. 4(c). That is, if no distortion correction is made, an image to be displayed has inner pincushion distortion as shown in FIG. 4(a). Such distortion is corrected to uniform pincushion distortion as shown in FIG. 4(b) by means of the distortion correction circuit 100 of the present embodiment. Moreover, by correcting pincushion distortion by means of the DPC circuit in the deflection circuit 300 additionally, an image which is completely free from pincushion distortion is displayed on the CRT as shown in FIG. 4(c).

Figure 6A:
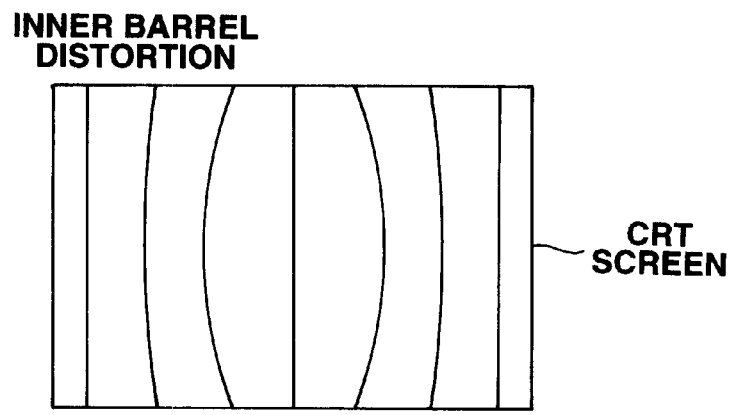
FIGS. 6(a)–(c) are diagrams for describing an inner barrel distortion correction sequence in the circuit of FIG. 1.
Figure 6B:
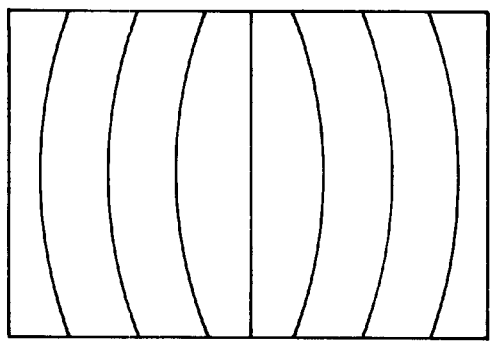

The correction procedure of an inner barrel distortion as shown in FIG. 6(a) will be described below with reference to FIGS. 5(a) and (b) as well as FIGS. 6(a)–(c).

If inner barrel distortion occurs under the condition where no distortion correction is made, such distortion can be corrected by inverting the polarity of the modulation waveform of the reading speed as shown in FIG. 3(a) into the polarity as shown in FIG. 5(a).

FIG. 5(a) shows the modulation waveform of the reading speed at 1V. FIG. 5(b) shows the modulation waveform of the reading speed at 1H. To correct inner barrel distortion, as shown in FIG. 5(a), it is necessary to slow down the modulating speed in the horizontal direction in the center part at 1V on the screen and to speed up the modulating speed in the upper and lower parts of the screen. On the other hand, as shown in FIG. 5(b), it is necessary to slow down the modulating speed in the center part at 1H on the screen and to speed up it in the right and left parts of the screen. It is also necessary, as shown in FIG. 5(b), to change the modulating speed regarding the period of 1H in the center part at 1V on the screen and in the upper and lower parts on the screen. That is, as shown in FIG. 5(b), it is necessary to decrease the modulating speed on the scanning lines in the center part to become slower than that on the scanning lines in the upper and lower parts at the right and left parts of the screen. In other words, it is necessary to increase the modulating speed on the scanning lines in the upper and lower parts to become faster than that on the scanning lines in the center part at the right and left parts of the screen.

Figure 6C:
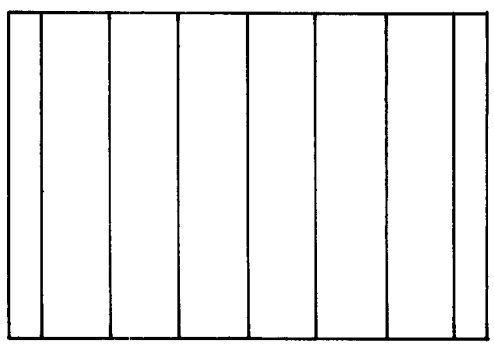
Figure 7:
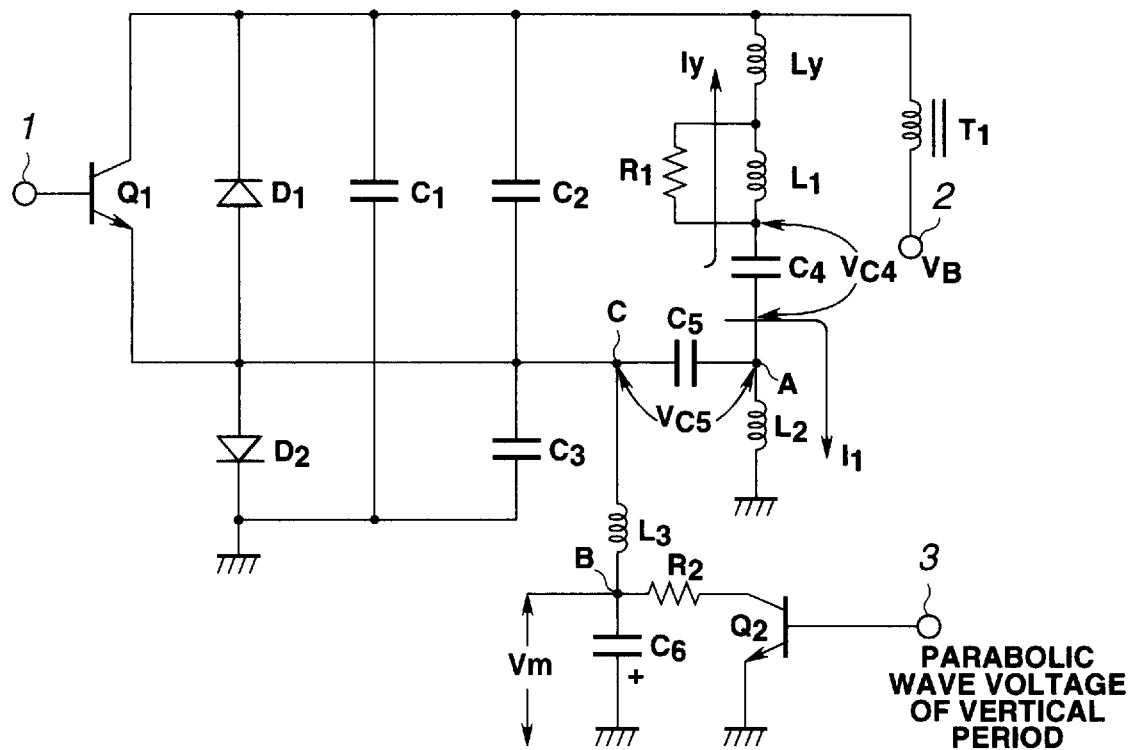
FIG. 7 is a circuit diagram of the conventional distortion correction circuit of diode modulator system of negative type
Figure 8:
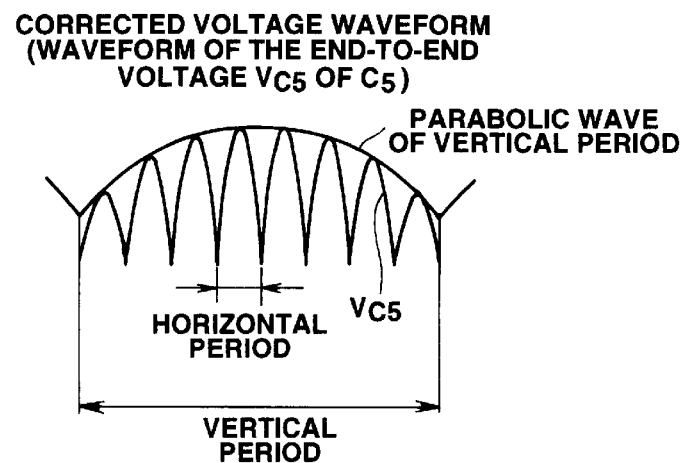
FIG. 8 is a diagram showing the correction voltage waveform in the circuit of FIG. 7.
Figure 9A:
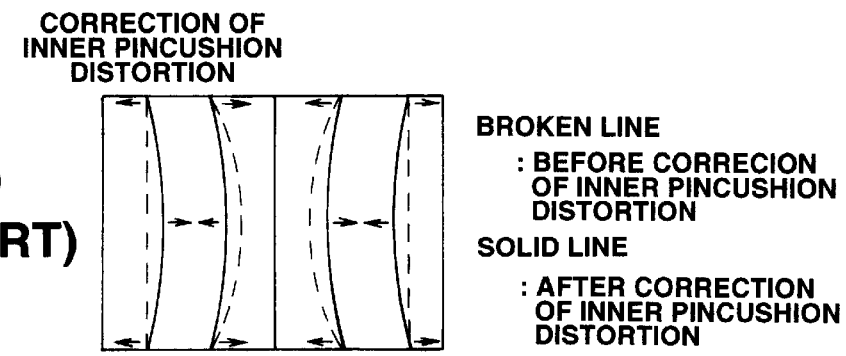
FIGS. 9(a) and (b) are diagrams for describing an inner pincushion distortion correction sequence in the circuit of FIG. 7.
Figure 9B:
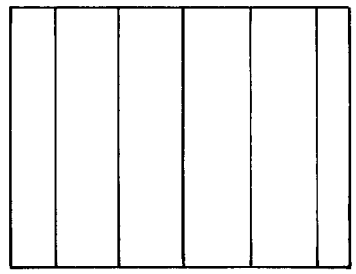
Figure 10:
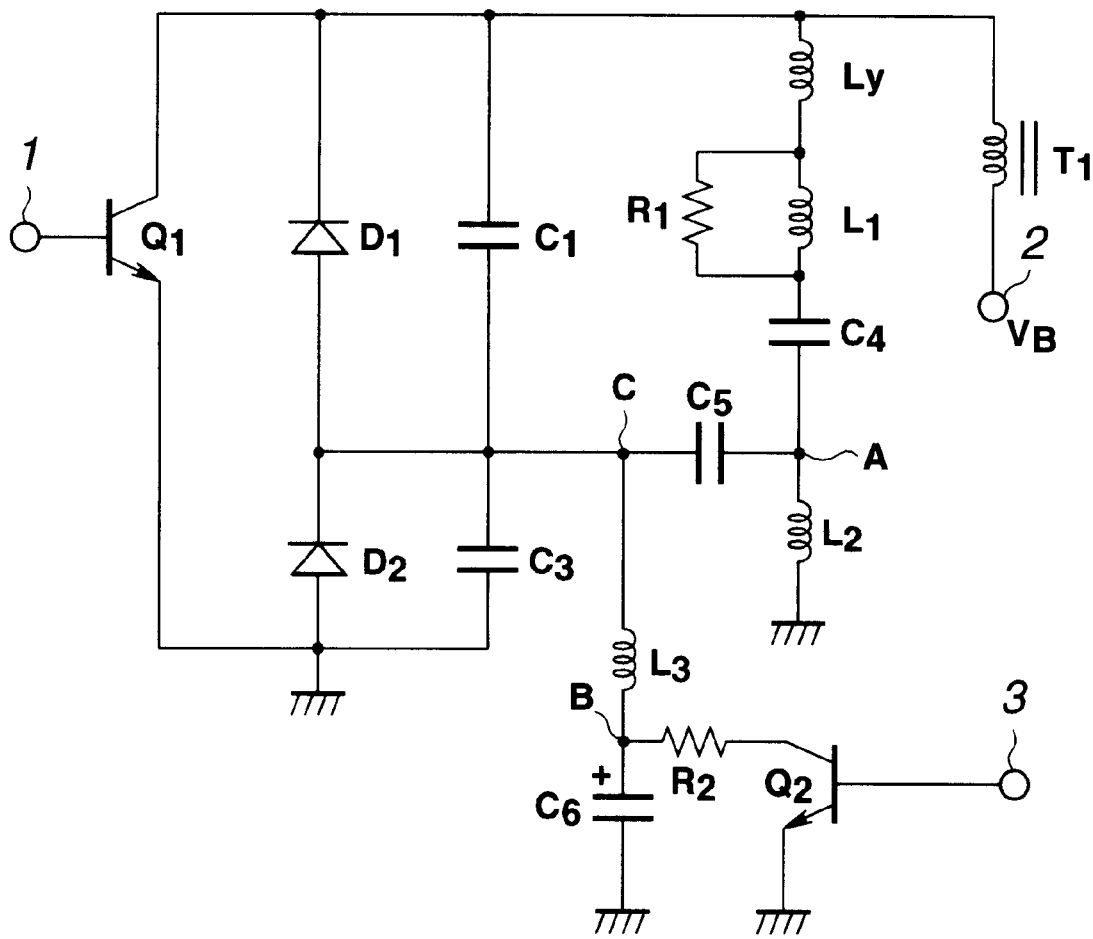
FIG. 10 is a circuit diagram of the conventional distortion correction circuit of diode modulator system of positive type.

Using the 1V and 1H reading speed modulation means by the line memory circuit 128 as described above, the distortion of an image to be displayed on the CRT is corrected as shown in FIG. 6(c). That is, if no distortion correction is made, an image to be displayed has inner barrel distortion as shown in FIG. 6(a). Such distortion is corrected to uniform barrel distortion as shown in FIG. 6(b) by means of the distortion correction circuit 100 of the present embodiment. Moreover, by correcting the barrel distortion by means of the DPC circuit in the deflection circuit 300 additionally, an image which is free from barrel distortion is displayed on the CRT as shown in FIG. 6(c).

As described above, according to the present invention, the conventional analog correction of inner pincushion distortion or inner barrel distortion by a deflection circuit can be digitally corrected by modulating an image signal itself. As a result, no circuit drift due to the conventional analog correction occurs and no complicated analog circuit design is required.

The present invention is not limited to the above-mentioned embodiments, but various changes and modifications can be made without departing from the scope of the present invention.

What is claimed is:

1. A distortion correction circuit comprising:
    an analog-to-digital (A/D) conversion means for receiving an analog luminance signal and analog color difference signals to convert them into the corresponding digital signals respectively;
    a memory means for storing digital signals from the A/D conversion means;
    a write/read controlling means for controlling the write/read operations for said memory means and for modulating the reading speed parabolically with both a horizontal period and a vertical period when reading the data having been written in said memory means; and a digital-to-analog (D/A) conversion means for converting the signals read out of said memory means into an analog luminance signal and analog chrominance difference signals;

wherein said write/read controlling means comprises means for correcting inner pincushion distortion when the reading speed is modulated parabolically, the means for correcting including (i) means for increasing the modulating speed in the horizontal direction in the center part of the screen during the vertical period and decreasing the modulating speed at the upper and lower parts of the screen, (ii) means for decreasing the modulating speed in the center part of the screen during the horizontal period and increasing the modulating speed at right and left parts of the screen, and (iii) further regarding the center part of the screen and the upper and lower parts during the vertical period, means for increasing the modulating speed on the scanning lines in the center part compared with that on the scanning lines in the upper and lower parts at the right and left parts of the screen.

2. A distortion correction circuit comprising:

an analog-to-digital (A/D) conversion means for receiving an analog luminance signal and analog color difference signals to convert them into the corresponding digital signals respectively;

a memory means for storing digital signals from the A/D conversion means;

a write/read controlling means for controlling the write/read operations for said memory means and for modulating the reading speed parabolically with both a horizontal period and a vertical period when reading the data having been written in said memory means; and a digital-to-analog (D/A) conversion means for converting the signals read out of said memory means into an analog luminance signal and analog chrominance difference signals;

wherein said write/read controlling means comprises means for correcting inner pincushion distortion when the reading speed is modulated parabolically, the means for correcting including (i) means for increasing the modulating speed in the horizontal direction in the center part of the screen during the vertical period and decreasing the modulating speed at the upper and lower parts of the screen, (ii) means for decreasing the modulating speed in the center part of the screen during the horizontal period and increasing the modulating speed at right and left parts of the screen, and (iii) further regarding the center part of the screen and the upper and lower parts during the vertical period, means for increasing the modulating speed on the scanning lines in the center part compared with that on the scanning lines in the upper and lower parts at the right and left parts of the screen.

3. A write/read controlling means in the distortion correction circuit according to claim 1, comprising:

a clock generating circuit for generating a first timing signal, a first write clock having a frequency of a predetermined multiple of a horizontal scanning frequency and a second clock having a frequency of a predetermined multiple different from the above multiple of the horizontal scanning frequency on the basis of the horizontal synchronizing signal;

a digital control oscillator for generating a clock, on the basis of said second clock, whose oscillation frequency is parabolically modulated with both horizontal period and vertical period;

a horizontal parabolic wave generating circuit for generating the parabolic wave signal of the horizontal period on the basis of said horizontal synchronizing signal and supplying the signal to said digital control oscillator;

a vertical parabolic wave generating circuit for generating the parabolic wave signal of the vertical period on the basis of said vertical synchronizing signal and supplying the signal to said digital control oscillator;

a digital-to-analog converter for converting the output of said digital control oscillator into an analog signal and outputting that signal to said memory means as a read clock; and a timing generating circuit for generating a write timing signal on the basis of said first timing signal and said first write clock, and also generating a read timing signal on the basis of said first timing signal and a read clock from said digital-to-analog converter.

4. A write/read controlling means in the distortion correction circuit according to claim 2, comprising:

a clock generating circuit for generating a first timing signal, a first write clock having a frequency of a predetermined multiple of a horizontal scanning frequency and a second clock having a frequency of a predetermined multiple different from the above multiple of the horizontal scanning frequency on the basis of the horizontal synchronizing signal;

a digital control oscillator for generating a clock, on the basis of said second clock, whose oscillation frequency is parabolically modulated with both horizontal period and vertical period;

a horizontal parabolic wave generating circuit for generating the parabolic wave signal of the horizontal period on the basis of said horizontal synchronizing signal and supplying the signal to said digital control oscillator;

a vertical parabolic wave generating circuit for generating the parabolic wave signal of the vertical period on the basis of said vertical synchronizing signal and supplying the signal to said digital control oscillator;

a digital-to-analog converter for converting the output of said digital control oscillator into an analog signal and outputting that signal to said memory means as a read clock; and a timing generating circuit for generating a write timing signal on the basis of said first timing signal and said first write clock, and also generating a read timing signal on the basis of said first timing signal and a read clock from said digital-to-analog converter.

* * * * *